Patented May 2, 1933

1,907,392

UNITED STATES PATENT OFFICE

OSCAR HAYEN STOVER, OF BUFFALO, NEW YORK

ANÆSTHETIC

No Drawing.   Application filed February 28, 1931. Serial No. 519,264.

This invention relates to anæsthetics of the kind which may be either applied topically or by injection.

The objects of this invention are to produce an anæsthetic which is capable of producing topical anæsthesia, which is of low toxicity, and which is not habit forming; also to produce an anæsthetic which is soluble in certain oils, so that the resulting solution, whether applied topically or injected acts more readily upon the nerves in the tissues of the body; also to produce an anæsthetic which may be carried by an oil in excess of the solubility of the anæsthetic therein; also to improve anæsthetics of this kind in other respects hereinafter specified.

For use in producing local anæsthesia, the hydrochloride of diethyl-amino-ethanol ester of p-amido benzoic acid, commonly known as "Procaine" or "Novocaine", and hereinafter referred to as "Procaine", has almost entirely taken the place of cocaine for injection anæsthesia, since the former is much less toxic. Procaine, however, is not effective in producing topical anæsthesia, and is not soluble in oils or other vehicles by means of which it can be readily carried through the skin or mucous surfaces for producing topical anæsthesia. I have found, however, that if procaine base is used, instead of the hydrochloride, a new anæsthetic can be produced, which has new and desirable properties.

In the production of this anæsthetic, the procaine base may be derived from any suitable source. For example, procaine base may be made by acting on a procaine solution in water with an alkali which reacts with the HCl radical of the procaine hydrochloride and reduces the hydrochloride to the base. This base is not soluble in water, and will, consequently, be precipitated in the reaction vessel, and may be removed from the water in any suitable manner. For example, this precipitate may be dissolved in ether, chloroform, or other solvent not miscible with water, while the precipitate is in the aqueous solution, and the ether or chloroform may then be allowed to separate from the water solution, and can be drawn off into an evaporating vessel. Upon evaporation of the ether or chloroform, pure crystals of procaine base will remain in the vessel. Any other means for producing procaine base may be employed, if desired.

The procaine base is soluble in oils. In order to produce the best effects, however, it is preferred to use only animal and vegetable oils, and not mineral oils, for the reason that the latter are not readily absorbed by the various tissues of the body. The base is soluble to different degrees in different oils, and in the case of most oils, the base is soluble only to a fairly limited extent, so that good anæsthesia is not readily obtainable with most oils. In the case of lanolin, as much as 10% of the base can be dissolved in lanolin, which is sufficient to produce good anæsthesia, but lanolin is, of course, only usable in topical applications, since lanolin solidifies at ordinary room temperatures, so that an anæsthetic made by dissolving procaine base in lanolin cannot be used for injections.

In connection with most other oils, I found that the oils alone do not carry sufficient quantities of the anæsthetic to produce the necessary anæsthesia, and I, therefore, add to the oil a solvent for the base, which, when mixed with the oil, makes it possible to incorporate in the mixture of oil and solvent sufficient procaine base to produce the desired anæsthesia. Alcohol can be conveniently used as a solvent for the base, but any other solvent for the base which is non-poisonous and not excessively irritating may be employed instead of alcohol. Various different kinds of vegetable oils may be used, which should be thoroughly purified and sterilized. For example, when olive oil is used, a very good grade should be selected, and it should preferably be centrifuged for about ten or fifteen minutes and only the clear oil used. This clear oil may be placed in a water bath and heated on three successive days for a period of one hour at a temperature of 100° C. to sterilize it. Lanolin may also be sterilized in the same manner described for olive oil, and other vegetable oils may be treated in the same manner as described for olive oil. In using commercial grades of alcohol in connection with vegetable oils, I find that the water present in the alcohol separates out in the oil, and it is, therefore, desirable either to use a solvent which is entirely free from water, or else to use some material which will absorb the water. For example, anhydrous lanolin has this property when used in connection with alcohol and oil.

By way of example, a very satisfactory anæsthetic is produced by using 15% or 7½ grams of procaine base, 75% or 37½ cc of olive oil, 5% or 2½ cc of commercial ethyl alcohol of approximately 95% strength, and 20% or 10 cc of lanolin. The lanolin is first mixed with the alcohol, and the procaine base is then added, and the mixture is heated to thoroughly dissolve the base. The olive oil is then added.

In using the preparation made in accordance with this example, I have found that some of the procaine base seems to be held in suspension in the liquid in a very finely divided stage, and if the liquid is left standing for several days, the base will settle in the bottom of the container, but can be readily again placed in suspension by shaking the container. I have also found that the undissolved procaine base, which is carried in suspension in the liquid, appears to be just as effective in producing anæsthesia as the dissolved procaine base.

The anæsthetic solution described can be slightly altered by decreasing the amount of olive oil from 75% to 70%, and adding 5% of methyl salicylate. The procaine base is very soluble in methyl salicylate, and when a small amount of methyl salicylate is used, all of the procaine base appears to be in solution. By using a small amount of methyl salicylate, the usual irritation produced by methyl salicylate is not noticeable in this anæsthetic.

It will be clear that in the foregoing examples, the olive oil may be replaced by any vegetable or animal oil.

Numerous other combinations of procaine base with animal and vegetable oils may be made in various proportions, depending upon the effects desired. For example, equal parts of olive oil and chloroform may be used to dissolve 40% of procaine base, which produces very good anæsthetic and analgesic effects. Methyl salicylate with 40% of procaine base produces an anæsthetic which may be used in certain cases on the skin. This preparation produces good anæsthesia, but may be irritating, particularly, if used on a mucous membrane. 20% of procaine base may be dissolved in oil of cloves with satisfactory results.

In the use of my improved anæsthetic, the same may be applied, for example, by rubbing, on the skin or on a mucous membrane, to produce surface anæsthesia. I have also found that if an anæsthetic is poured on a cut or open wound, it produces immediate local anæsthesia. Neither of these two effects can be produced by procaine hydrochloride or novocaine. Furthermore, my improved anæsthetic has been used very successfully for spinal anæsthesia, and may be used to produce local anæsthesia by injecting hypodermically.

I claim as my invention:

1. An anæsthetic including a non-mineral oil having procaine base added thereto in excess of the amount normally soluble in the oil, and a solvent for said base miscible with the oil, and in which said base has greater solubility than in said oil, whereby the oil carries in solution said excess amount of said base.

2. An anæsthetic including a non-mineral oil having procaine base added thereto in excess of the amount normally soluble in the oil, and a solvent, comprising alcohol, for said base miscible with the oil, and in which said base has greater solubility than in said oil, whereby the oil carries in solution said excess amount of said base.

3. An anæsthetic including 11% or more by weight of procaine base, a non-mineral oil, and a solvent for said base miscible with the oil, and in which said base has greater solubility than in said oil, whereby the oil carries in solution all of said base.

4. An anæsthetic including 11% or more by weight of procaine base, a non-mineral oil, and a solvent, comprising alcohol, for said base miscible with the oil, and in which said base has greater solubility than in said oil, whereby the oil carries in solution all of said base.

5. An anæsthetic including a non-mineral oil having procaine base added thereto in excess of the amount normally soluble in the oil, a solvent, comprising commercial alcohol, for said base miscible with the oil, and in which said base has greater solubility than in said oil, and anhydrous lanolin, whereby the oil carries in solution said excess amount of said base.

OSCAR HAYEN STOVER.